US010352239B2

(12) United States Patent
Brun et al.

(10) Patent No.: US 10,352,239 B2
(45) Date of Patent: Jul. 16, 2019

(54) INLET FILTER FOR GAS TURBINE ENGINES USING DISPOSABLE SURFACE ADHESIVE

(71) Applicant: Southwest Research Institute, San Antonio, TX (US)

(72) Inventors: Klaus Brun, San Antonio, TX (US); Jacob M. Delimont, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 390 days.

(21) Appl. No.: 15/267,263

(22) Filed: Sep. 16, 2016

(65) Prior Publication Data

US 2018/0080381 A1    Mar. 22, 2018

(51) Int. Cl.
*F02C 7/052* (2006.01)

(52) U.S. Cl.
CPC ........ *F02C 7/052* (2013.01); *F05D 2220/329* (2013.01); *F05D 2230/60* (2013.01); *F05D 2260/607* (2013.01); *F05D 2270/804* (2013.01); *Y02T 50/675* (2013.01)

(58) Field of Classification Search
CPC .. F02C 7/052; F02C 7/05; F02C 7/055; F05D 222/329; F05D 2230/60; F05D 2260/607; F05D 2270/804; F24F 13/28; F24F 3/16; B01D 46/18; B01D 46/22; B01D 45/08; B01D 45/10
USPC ..................................................... 415/121.2
See application file for complete search history.

(56) References Cited

U.S. PATENT DOCUMENTS

| | | | | |
|---|---|---|---|---|
| 2,271,401 A * | 1/1942 | Sainty | .................... | B01D 46/00 55/290 |
| 3,092,723 A * | 6/1963 | Payne | ....................... | G01T 7/04 250/304 |
| 3,098,731 A * | 7/1963 | Greene | ................... | B01D 46/18 210/387 |
| 3,710,588 A * | 1/1973 | Martinez | ............... | F24F 3/1603 55/354 |
| 4,182,673 A * | 1/1980 | Schmidt | ................. | B01D 45/08 209/45 |
| 4,812,295 A * | 3/1989 | Bresowar | ............. | B01D 53/501 210/297 |
| 4,976,749 A * | 12/1990 | Adamski | ................. | B03C 3/155 55/354 |
| 5,599,363 A * | 2/1997 | Percy | ..................... | B01D 46/20 55/352 |
| 5,912,423 A * | 6/1999 | Doughty | ............... | F24F 3/1603 55/290 |
| 6,387,156 B1 * | 5/2002 | Richardson, Jr. | .. | B01D 46/0036 55/323 |

(Continued)

*Primary Examiner* — Aaron R Eastman
(74) *Attorney, Agent, or Firm* — Livingston Law Firm

(57) ABSTRACT

A method of filtering air entering the intake opening of a gas turbine engine. A straightening tube provides a straight channel for incoming air flow. A flow redirector provides a path for air flow that is at right angles to the channel provided by the straightening tube and that leads to the intake opening of the engine. A filter at the downstream end of the flow redirector has a pair of rollers for unrolling and re-rolling a roll of adhesive tape, with an exposed section of the adhesive tape blocking the downstream end of the flow redirector and capturing particles in the air flow. The rollers are activated as needed to expose fresh sections of tape.

5 Claims, 5 Drawing Sheets

(56) References Cited

U.S. PATENT DOCUMENTS

| | | | | |
|---|---|---|---|---|
| 2010/0077923 A1* | 4/2010 | Lewis | ................ | B01D 46/0023 96/18 |
| 2015/0027314 A1* | 1/2015 | Kavounas | .............. | B01D 45/10 96/418 |
| 2015/0033682 A1* | 2/2015 | Yoshida | ................ | B01D 46/16 55/354 |

* cited by examiner

INLET FILTER FOR GAS TURBINE ENGINES USING DISPOSABLE SURFACE ADHESIVE

TECHNICAL FIELD OF THE INVENTION

This invention relates to gas turbine engines, and more particularly to a filter assembly for filtering particles from the intake air.

BACKGROUND OF THE INVENTION

A gas turbine engine, also referred to as a combustion turbine engine, is a type of internal combustion engine. It has an upstream rotating compressor coupled to a downstream turbine, and a combustion chamber in between.

The basic operation of a gas turbine is that fresh atmospheric air flows through the compressor, which brings the air to higher pressure. Energy is then added by spraying fuel into the air and igniting it so the combustion generates a high-temperature flow. This high-temperature high-pressure gas enters a turbine, where it expands down to the exhaust pressure, producing a shaft work output in the process. The turbine shaft work is used to drive the compressor and other devices such as an electric generator that may be coupled to the shaft. Gas turbines may be used to power aircraft, trains, ships, electrical generators, or even tanks.

When a gas turbine is operated in a dusty environment, the intake air can include solid particulate matter, such as sand and dust, suspended in the intake air. If these particles are ingested into the gas turbine, they can cause significant harm to the engine.

Helicopters that operate in dusty and sandy environments are a special concern for intake of particulate matter. The downwash caused by the rotor blades during landing and takeoff lifts particles from the ground into the air. As a result, clouds of dust form around the helicopter. These dust clouds can be thick enough to block visibility—this condition is termed "brown out." A helicopter engine operating unprotected from dust and sand in these types of environments can be expected to have a small fraction of the life expectancy of a typical helicopter engine.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a system and method for removing the particles from the inlet airstream of a gas turbine engine.

For purposes of this description, the gas turbine engine is described as being used on a rotary or fixed wing aircraft. In a gas turbine engine that powers an aircraft, air filters are typically not used. In order to keep the velocity and thus pressure drop through such a filter to a reasonable level, the filter would have to be large enough to induce a significant drag penalty.

Thus, as alternatives to air filters, various other filtering techniques have been adopted. A common conventional technique is a cyclone separator. These separators induce a vortex structure in the flow which causes the particles, which are heavier than air, to move to the perimeter of the separator. The air near the perimeter of the separator is then ejected from the separator, while a "clean" center air column is ingested into the engine.

A characteristic of cyclone separators is that the larger the particles are, the more easily they move to the outside of the vortex. Thus, this type of separator system offers good protection against large particles (larger than approximately 10 μm), but smaller particles tend to enter the engine, with a very low percentage of the particles being removed. The size below which little harm will be caused to the gas turbine engine depends on engine geometry and air velocity, but particles 0.25 μm and smaller generally pass through the gas turbine without impacting and damaging the gas turbine.

Figure 1:
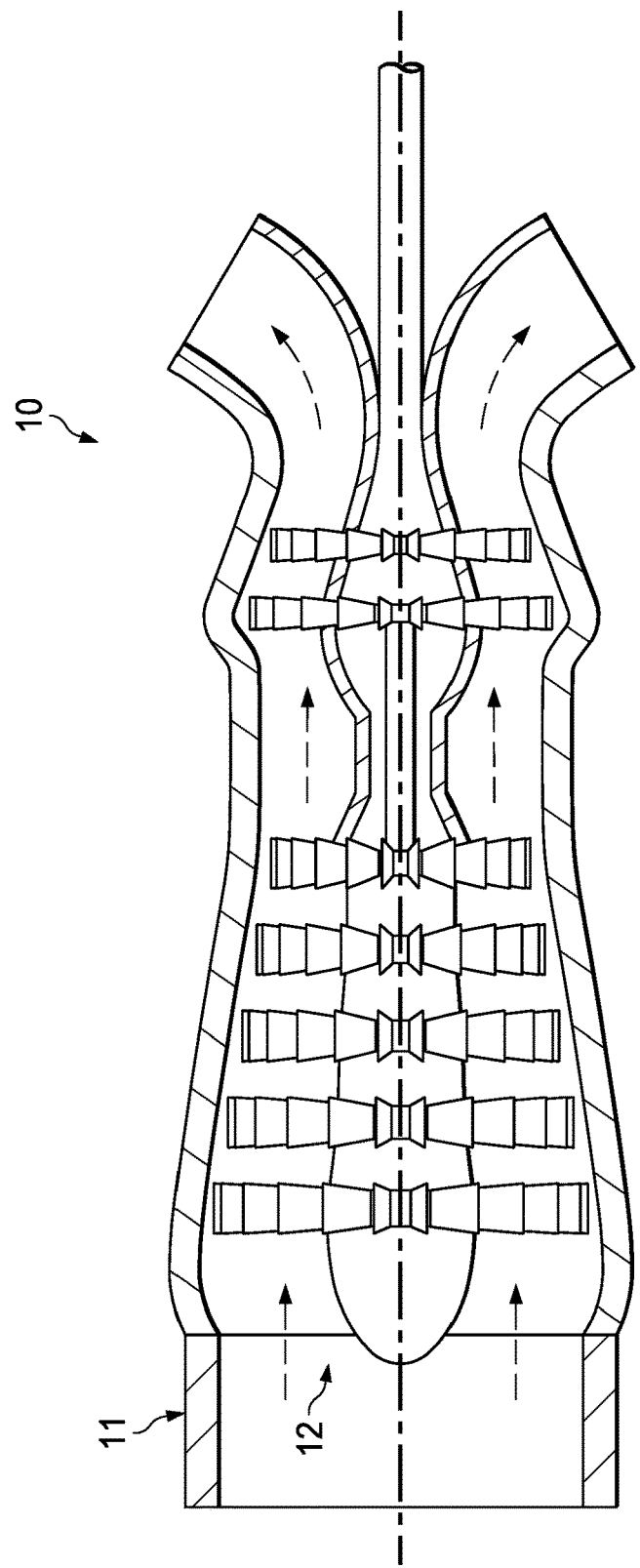
FIG. 1 illustrates a conventional gas turbine engine with a conventional particle separator at the engine intake.

FIG. 1 illustrates an example of a conventional gas turbine engine 10, such as might be used for a helicopter or fixed wing aircraft. The engine 10 is equipped with a conventional separator 11 for receiving intake air and removing most, if not all, of the larger-sized particles in the intake air stream. In this conventional gas turbine engine, air exits separator 11 directly into the engine's intake opening 12.

Figure 2:
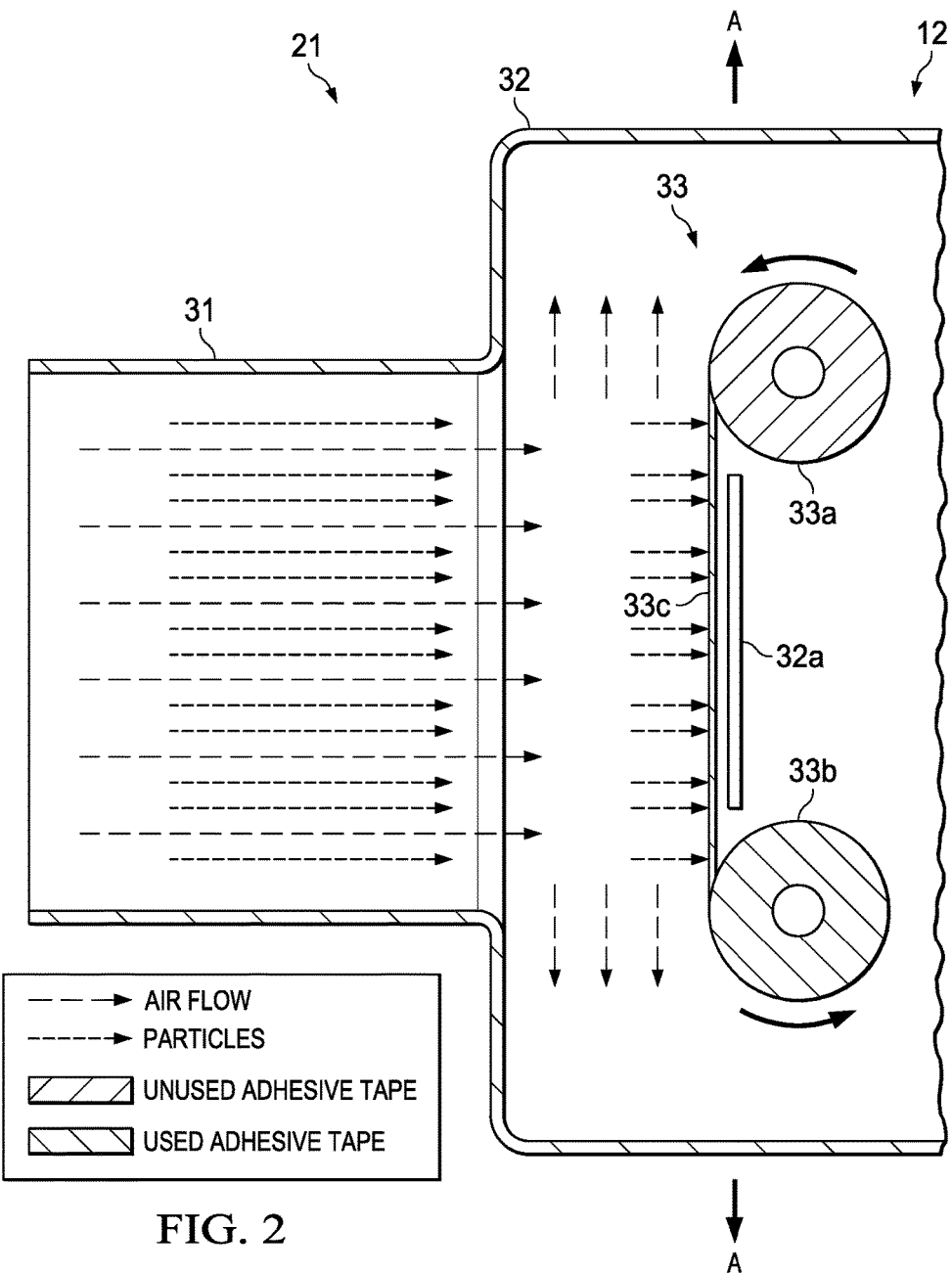
FIG. 2 illustrates a filter assembly in accordance with the invention, interposed between the separator and the engine intake.

FIG. 2 illustrates a filter assembly 21, in accordance with the invention, interposed in the intake air path between the separator 11 and the air intake opening 12 of the gas turbine engine 10. Although filter assembly 21 would work on intake air directly (without first passing through a separator), for purposes of example herein it is installed downstream of a separator 11. This allows filter assembly 21 to deal primarily with the smaller particles that pass through the separator 11.

The filter assembly 21 is mounted just downstream of separator 11. The air flow from separator 11, which contains particles not removed by the separator, enters a straightener tube 31 of filter assembly 21. This straightener tube 31 provides a straight channel for the incoming air, and straightens and accelerates the flow.

Then, the air flow enters a flow redirector 32, where the flow turns 90°. As explained below, the sudden 90° turn is caused by the presence of the surface filter 33. In other words, the air that leaves straightener tube 31 enters flow redirector 32 at a receiving (upstream) end of flow redirector, hits the filter assembly 33 at an opposite (downstream) end, and is redirected at ninety degrees to the intake opening of the engine.

Filter 33 consists of two rollers 33a and 33b, for unrolling and rolling a roll of adhesive tape 33c. One roller holds and unrolls a fresh portion of the roll of tape, and the other receives and re-rolls used tape.

The "exposed" portion of tape 33c between rollers 33a and 33b extends across and obstructs the downstream end of flow redirector 32. This portion of tape 33c has sufficient length and width so as to obstruct and redirect all or most of the air flow that reaches its surface. However, because particles in the air flow have more momentum than the air, they do not follow the air flow as the air flow turns ninety degrees. Rather, the particles adhere to the surface of tape 33*c*. The air flow exits flow redirector 32 via openings that are in fluid communication with the intake opening of the engine.

Although tape 33*c* is flexible so that it can be rolled, it is also sufficiently strong to prevent the force of the air from breaking it. The exposed portion of tape 33 may be sufficiently close to an end wall 32*a* of flow redirector 32 so as to provide some support.

Figure 3:
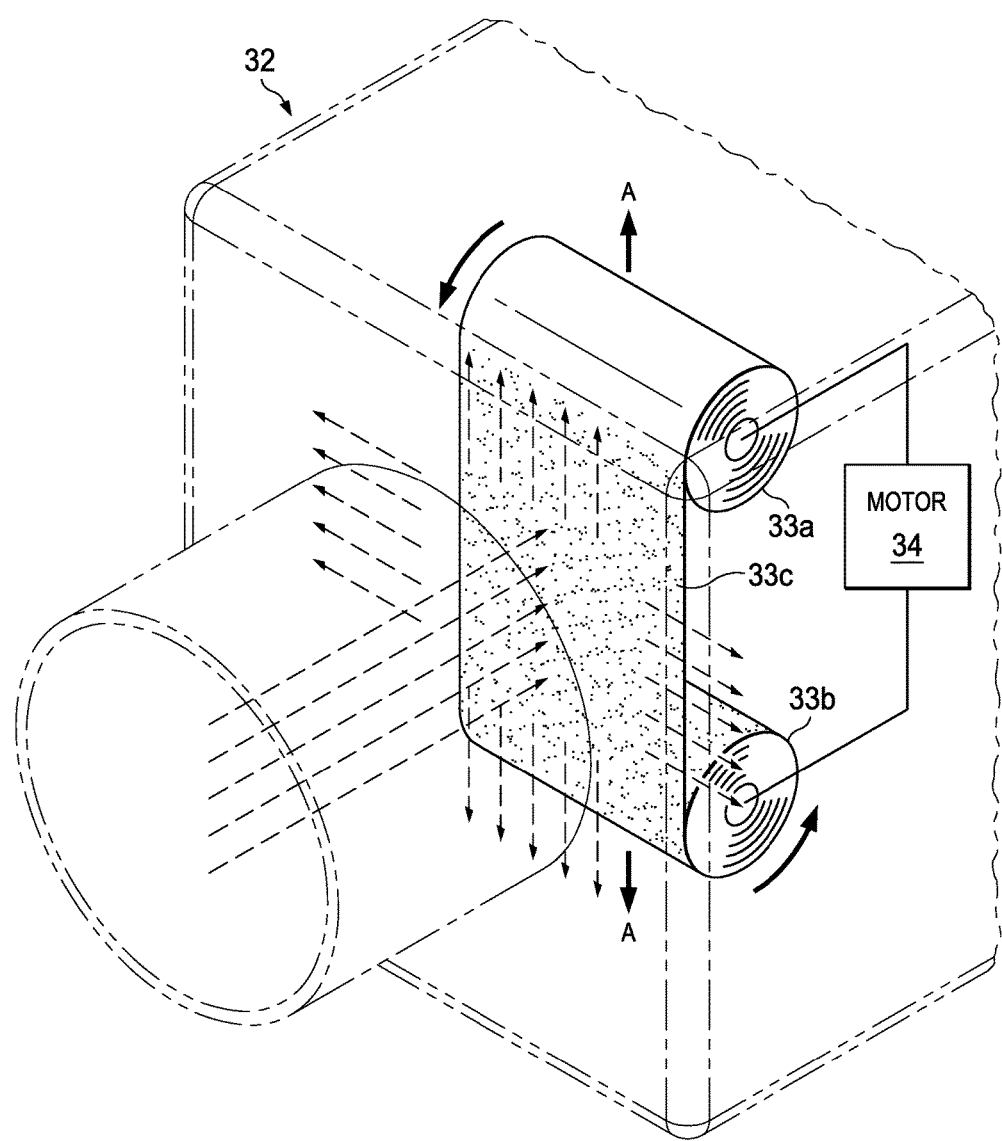
FIG. 3 illustrates a front view of the filter tape of the filter assembly.

FIG. 3 is a perspective view, showing the air flow from straightener tube 31 and flow redirector 32 onto the face of tape 33*c*. The air flow hits the adhesive side of tape 33*c*, where the particles adhere to the adhesive. The air flow is redirected from the face of the tape 33*c* to a path that will lead it to intake opening 12 of the engine.

The path from the flow redirector 32 to the intake opening 12 of the engine can take various forms but in general, is designed to optimize air flow. As indicated in FIG. 3, the top, bottom, and sides of flow redirector 32 may be open for this purpose. Flow redirector 32 need not be rectangular, and other configurations are possible, such as a cylindrical shape with its circumference providing fluid communication with the intake opening 12.

FIG. 3 further shows an electric motor 34, which is used to wind tape 33*c* from and to the respective rollers 33*a* and 33*b*. Motor 34 can be placed at any convenient location outside the path of the air flow, with electrical connections to rollers 33*a* and 33*b*. If desired, motor 34 can be a variable speed and/or stepper motor.

In operation, the two tape rollers 33*a* and 33*b* are rotated at the same speed, and in increments just long enough to provide a clean section of tape that obstructs the downstream end of flow redirector 32.

Experimentation can determine an expected duration of time until each freshly exposed section of tape 33*c* collects enough particles such that a next clean section of tape 33*c* is desired to be exposed. At that point, motor 34 rotates rollers 33*a* and 33*b* to expose the new clean section of tape 33*c*.

In order for filter assembly 33 to function properly, it is important that the adhesive surface of tape 33*c* not be so fully loaded with particles that subsequent particles impacting the surface hit particles already adhered to the surface. If particles hit adhesive tape previously coated with other particles, the incoming particles will not be as likely to stick to the tape. The rate at which the adhesive tape leaves the unused tape roller is dependent on the particle loading in the air flow.

Rollers 33*a* and 33*b* can be easily mounted at the end of flow redirector 32 with small brackets (not shown) or other hardware. Ideally, the attachment of rollers 33*a* and 33*b* is moveable, so that filter assembly 33 can be moved toward and away from the downstream end of flow redirector 32. This permits adjustment of filtration efficiency and air pressure drop, depending on the particle loading and flight needs.

Figure 4:
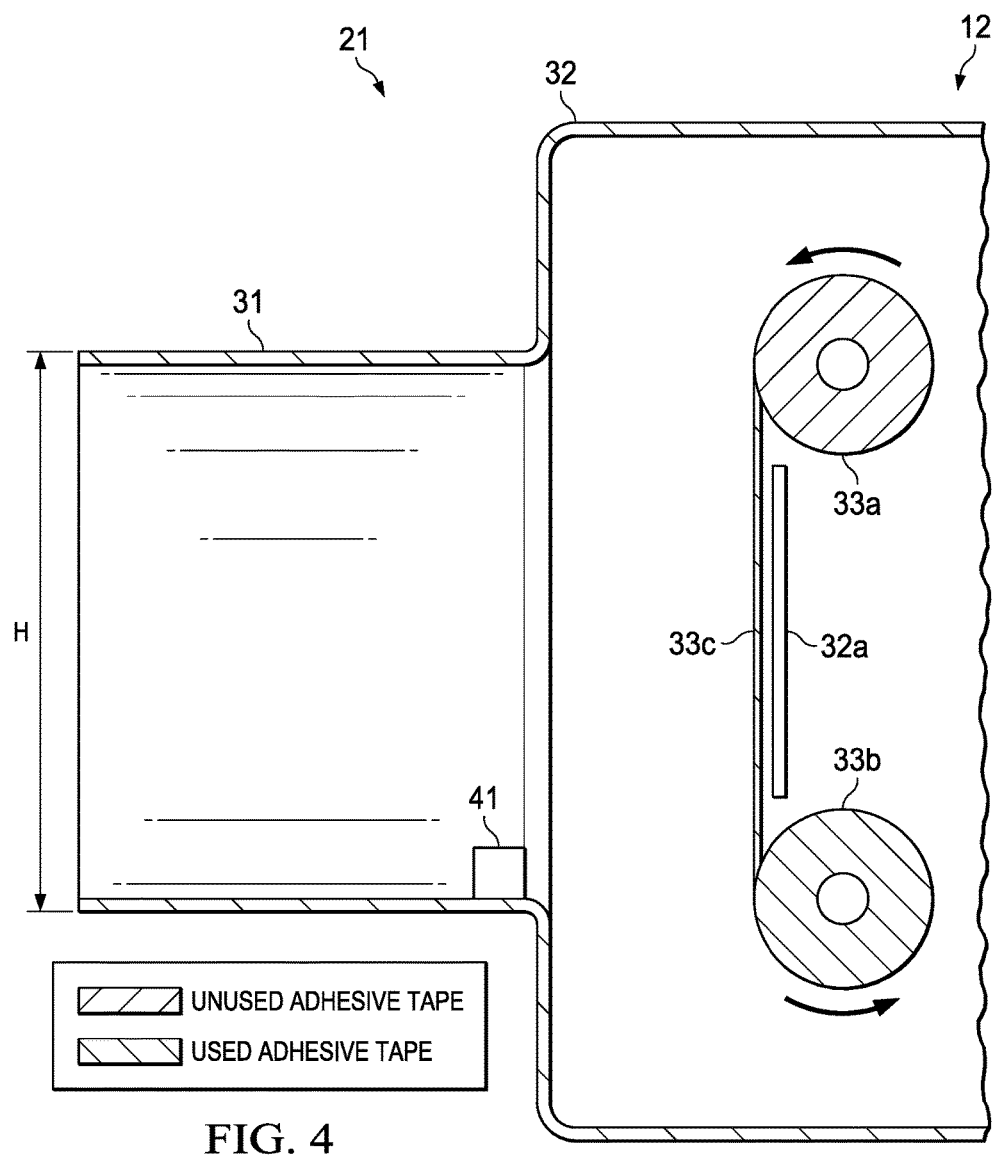
FIG. 4 illustrates an optional optical sensor for detecting the level of particle accumulation on the filter tape.

As illustrated in FIG. 4, an optional optical sensor 41 can be attached within flow redirector 32 to monitor the particle loading of the adhesive tape 33*c*. When the sensor 41 detects high particle loading of the adhesive tape 33*c*, rollers 33*a* and 33*b* can be activated to expose a new increment of tape. Further, sensor 41 can include appropriate processing and programming such that the rate of particle loading can be used to adjust the frequency at which rollers 33*a* and 33*b* are activated and tape 33*c* thereby incremented.

Other methods for controlling motor 34 and hence the tape speed are also possible. For examples, during landing and takeoff operations in a desert environment, motor 34 can be controlled to move tape 33*c* more quickly from the fresh roll to the used roll of tape. Once the aircraft is well clear of the ground and the rate of particle ingestion reduces significantly, there would be little, if any, need for the adhesive tape to move.

Figure 5:
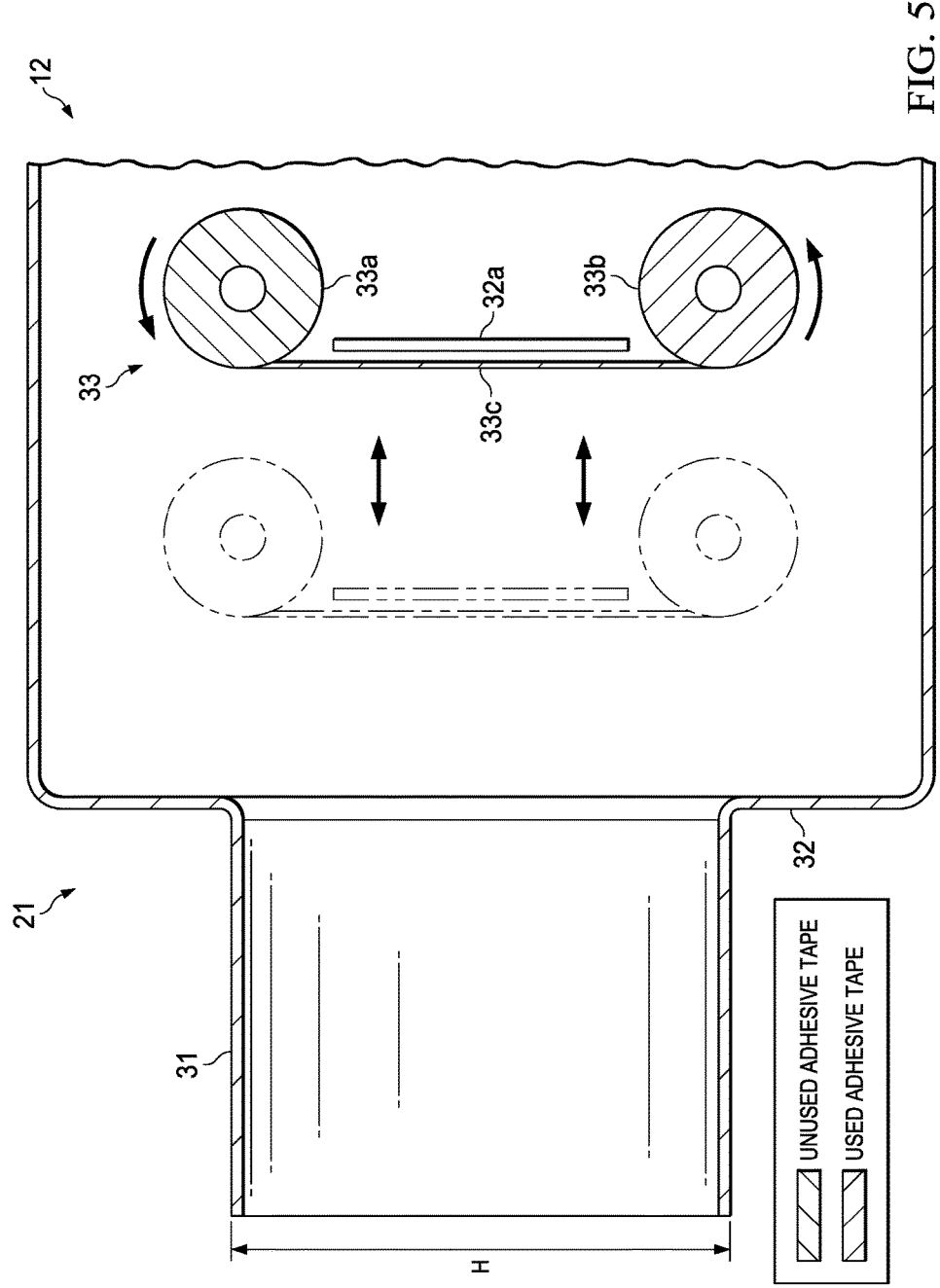
FIG. 5 illustrates how the rollers and tape of the filter assembly may be moved away from obstructing the air flow.

As illustrated in FIG. 5, another feature of filter assembly 21 is that the filter 33 can be repositioned toward and away from the downstream end of flow redirector 32. Referring to FIG. 2, when a significant amount of particulate is present in the atmosphere, the filter 33 is moved close to the end of flow redirector 32. This will cause even the smallest particles to adhere to the adhesive tape. However, in addition to causing the particles to stick to the adhesive tape, the high degree of flow turning will cause a pressure drop in the engine intake. Referring to FIG. 5, when the aircraft is not operating in a dusty environment, the filter 33 is moved away from the end of flow redirector 32. This will significantly reduce the amount of pressure drop in the engine intake. This will also allow the gas turbine engine 10 to have near normal fuel consumption and performance during parts of the mission profile when significant particle loading is not experienced.

Another important aspect of filter assembly 21 is that tape 33*c* is easily and rapidly interchangeable. It is expected that a used roll of tape 33*c* can be removed and replaced with a fresh roll of tape 33*c* in a matter of minutes. How often this process will take place will depend on the amount of particles ingested and filtered. The filter 33 can be designed to accommodate commercially available adhesive tape, such as conventional packaging tape.

In sum, filter assembly 21 provides for removal of particles less than 10 μm, with little extra aircraft weight. The variability of filter positioning should allow for little, if any, increase in pressure drop in normal flight conditions, but very good protection during landing and takeoff for a reasonable amount of pressure drop.

What is claimed is:

1. A method of filtering air entering the intake opening of a gas turbine engine of an aircraft, comprising:

installing a straightening tube upstream the intake opening, the straightening tube providing a straight channel for incoming air flow;

interposing a flow redirector between a downstream end of the straightening tube and the intake opening, the flow redirector providing a path for air flow that is at right angles to the channel provided by the straightening tube and that leads to the intake opening of the gas turbine engine; wherein the flow redirector has an upstream end for receiving air flow from the straightening tube and a downstream end opposite the receiving end;

installing a filter at the downstream end of the flow redirector, the filter comprising a first roller for storing and unrolling a roll of adhesive tape and a second roller for re-rolling and storing the roll of adhesive tape;

wherein the first roller and the second roller are spaced across the downstream end of the flow redirector, such that an exposed section of tape passing from the first roller to the second roller blocks the downstream end of the flow redirector with the adhesive side of the tape facing the air flow; and incrementally unrolling the first roller and rolling the second roller such that a fresh exposed section of the adhesive tape blocks the downstream end of the flow redirector; and moving the filter away from the downstream end of the flow redirector during flight conditions in which particle filtering is not desired.

2. The method of claim 1, wherein the step of installing a straightening tube is performed such that the straightening tube is downstream a particle separator.

3. The method of claim 1, further comprising using an optical sensor to determine the extent to which the exposed section of adhesive tape is loaded with particles.

4. The method of claim 1, wherein the step of incrementally unrolling the first roller and rolling the second roller is adjusted such that a rate of refreshing the fresh section of adhesive tape is determined by an amount of particles in the intake air.

5. The method of claim 1, further comprising removing a roll of adhesive tape from the second roller, and replacing it with a new roll of adhesive tape on the first roller.

* * * * *